United States Patent [19]

Ruigrok et al.

[11] 3,829,986

[45] Aug. 20, 1974

[54] FORAGE DRYER

[75] Inventors: Hendricus Cornelius Maria Ruigrok, Percival St., Clarendon; Hendricus Maria Kuipers, Vineyard Via Riverstone, N. S. W., both of Australia

[73] Assignee: said Ruigrok, by said Kuipers

[22] Filed: Aug. 30, 1971

[21] Appl. No.: 176,216

[30] Foreign Application Priority Data
Aug. 31, 1970  Australia............................. 2358/70

[52] U.S. Cl....................... 34/216, 34/217, 34/233
[51] Int. Cl............................................ F26b 19/00
[58] Field of Search ............ 34/201, 215, 216, 217, 34/168, 203, 233, DIG. 12, DIG. 15, 207–211; 241/56, 57; 99/8

[56] References Cited
UNITED STATES PATENTS

| | | | |
|---|---|---|---|
| 1,755,016 | 4/1930 | Murphy | 34/DIG. 12 |
| 2,100,150 | 11/1937 | Randolph | 34/DIG. 12 |
| 2,148,946 | 2/1939 | Hubmann et al. | 34/168 |
| 2,350,096 | 5/1944 | Chilton | 34/203 |
| 2,624,447 | 1/1953 | Small | 34/DIG. 12 |
| 3,288,051 | 11/1966 | Dodgen et al. | 99/8 |
| 3,658,263 | 4/1972 | Zeisler et al. | 241/57 |

FOREIGN PATENTS OR APPLICATIONS
1,187,108  4/1970  Great Britain ........................ 34/168

Primary Examiner—Kenneth W. Sprague
Assistant Examiner—James C. Yeung
Attorney, Agent, or Firm—Stevens, Davis, Miller & Mosher

[57] ABSTRACT

The invention is a forage dryer apparatus including a drying chamber having means for feeding forage to be dried into the top of the chamber and distributing it throughout the chamber, a plenum box at the bottom of the chamber, a grille system defining the bottom of the chamber and the top of the plenum box for supporting forage when inoperative but for discharging forage into the plenum box when operative, as well as means for delivering drying gas into the plenum box for upward discharge through the grille system, and means for removing dried forage from the plenum box.

10 Claims, 11 Drawing Figures

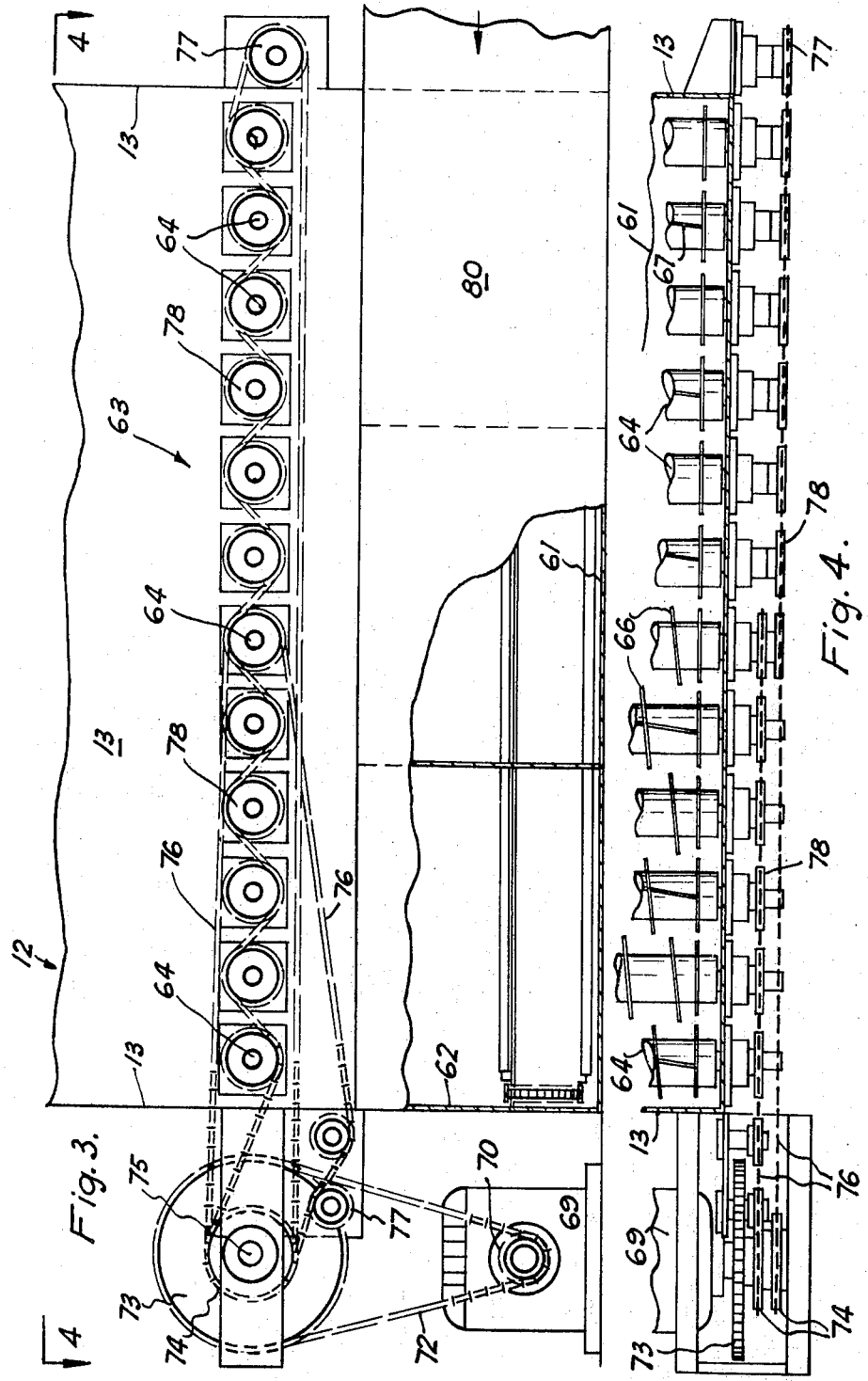

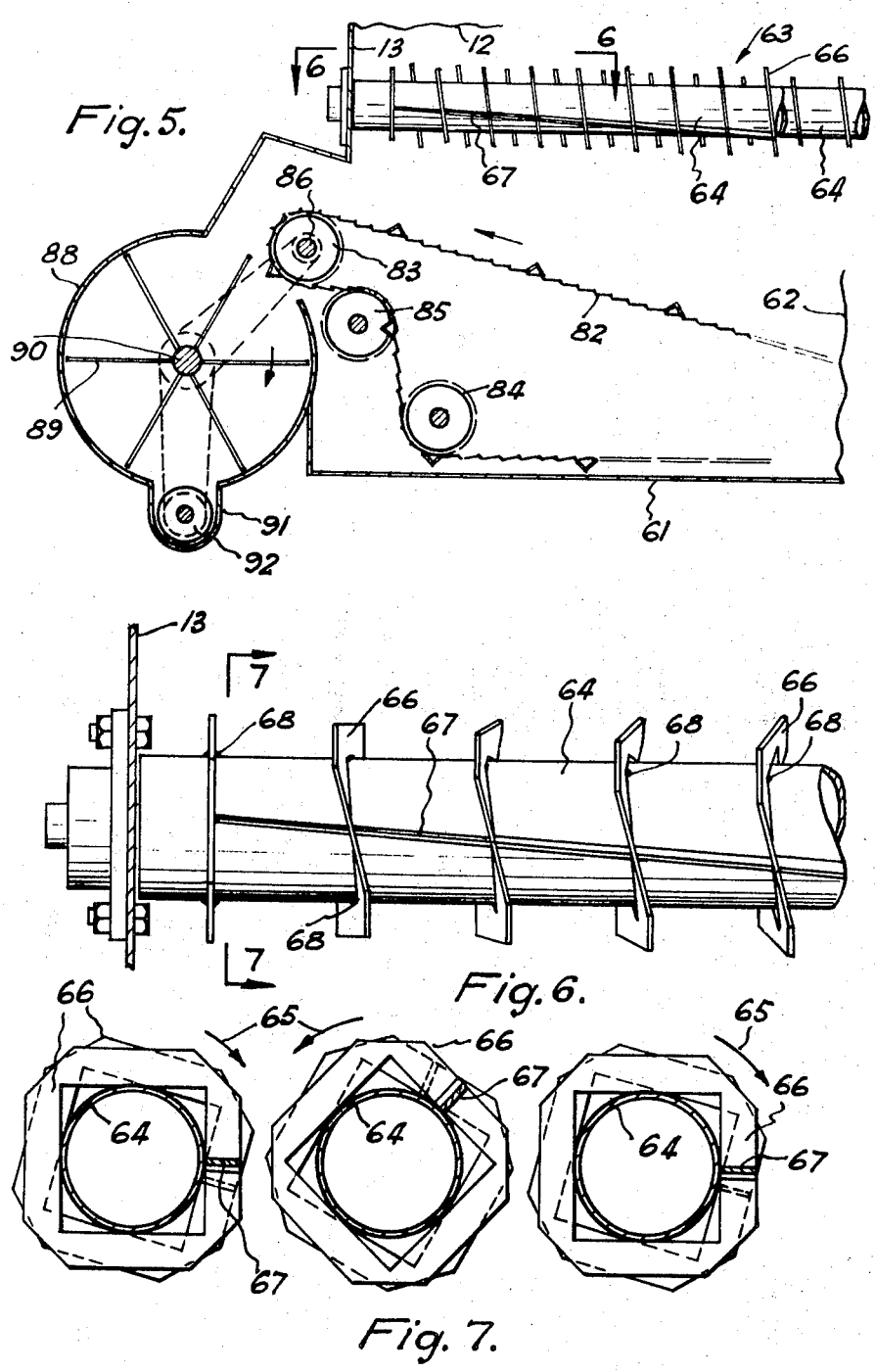

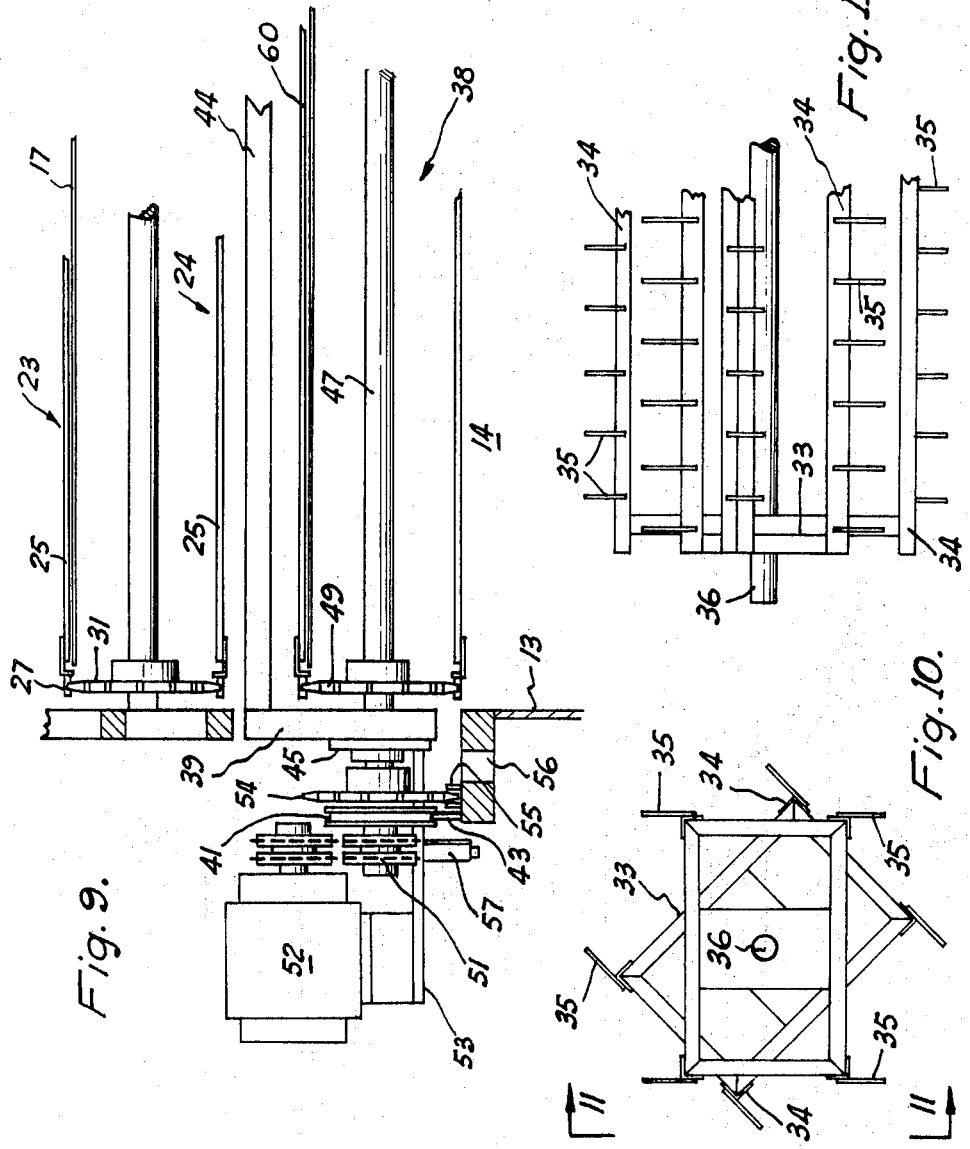

FORAGE DRYER

The object of this invention is to provide simple apparatus whereby green grass and other forage vegetation may be automatically and continuously demoisturized to a degree sufficient for storage in any required form in the form of fodder pellets for example. In short, the invention resides in an automatically operating hay-maker which is able to dry forage continuously and, if desired, directly follow the harvesting thereof.

The invention provides:

A forage dryer comprising:
a. a drying chamber;
b. means for feeding forage to be dried into the top of said chamber and distributing it laterally and longitudinally of said chamber;
c. a plenum box at the bottom of said chamber;
d. a forage support grille which defines the bottom of said chamber and the top of said plenum box, which is operable to discharge dried forage from said chamber into said plenum box, and which when inoperative is able to support forage deposited in said chamber;
e. drive mechanism for operating said grille;
f. means for delivering a drying gas into said plenum box for upward discharge through said grille; and
g. means for removing dried forage from said plenum box.

An example of the invention is illustrated in the drawings herewith.

FIG. 3 is a partly-sectioned and incomplete end elevation (on an enlarged scale) looking in the direction of line 3—3 in FIG. 2.

FIG. 4 is an incomplete sectional plan taken on line 4—4 in FIG. 3.

Figure 2:
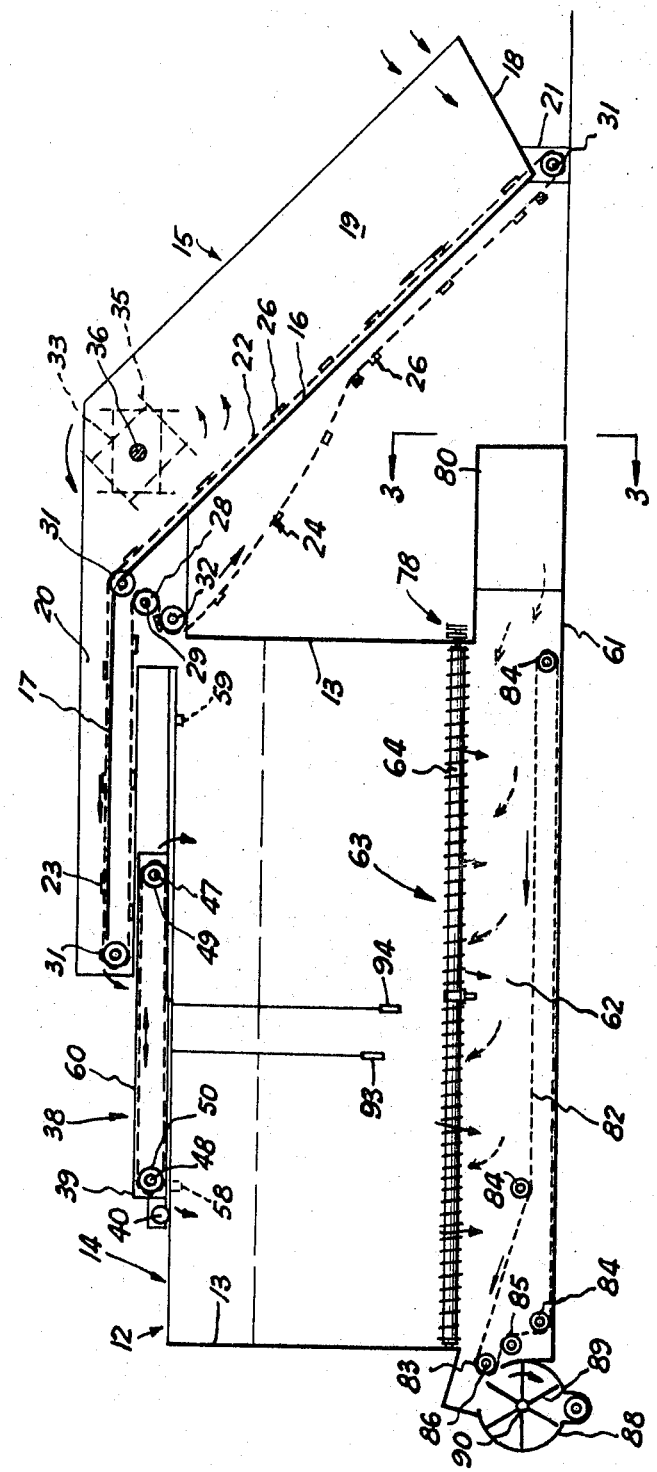
FIG. 2 is a sectional side elevation taken on line 2—2 in FIG. 1.

FIG. 5 repeats a bottom left hand corner portion of FIG. 2 on a larger scale.

FIG. 6 is a side elevation of one end portion of a rotor forming a part of the forage support grille.

FIG. 7 is a sectional end elevation of three rotors, the leftmost of which is taken on line 7—7 in FIG. 6.

Figure 8:
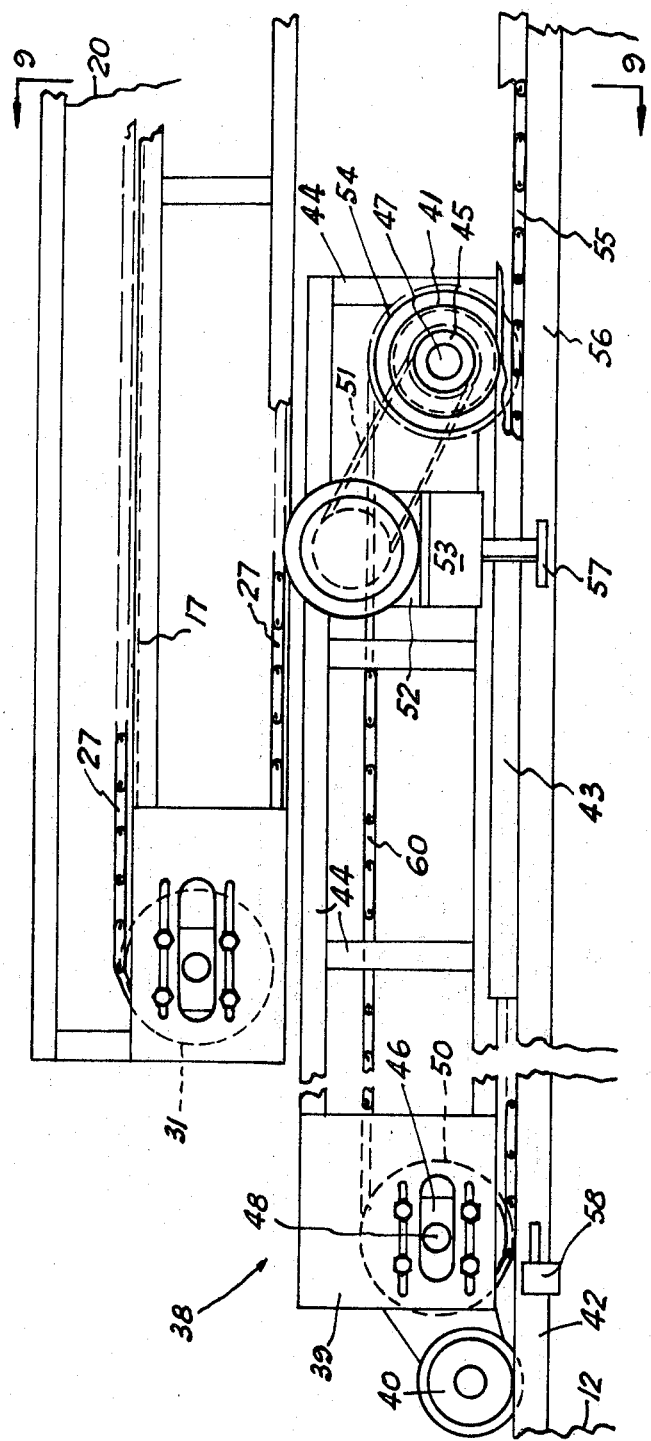

FIG. 8 is a side elevation, on an enlarged scale, of parts shown in less detail in FIG. 2.

FIG. 9 is an incomplete sectional end elevation taken on line 9—9 in FIG. 8.

Figure 1:
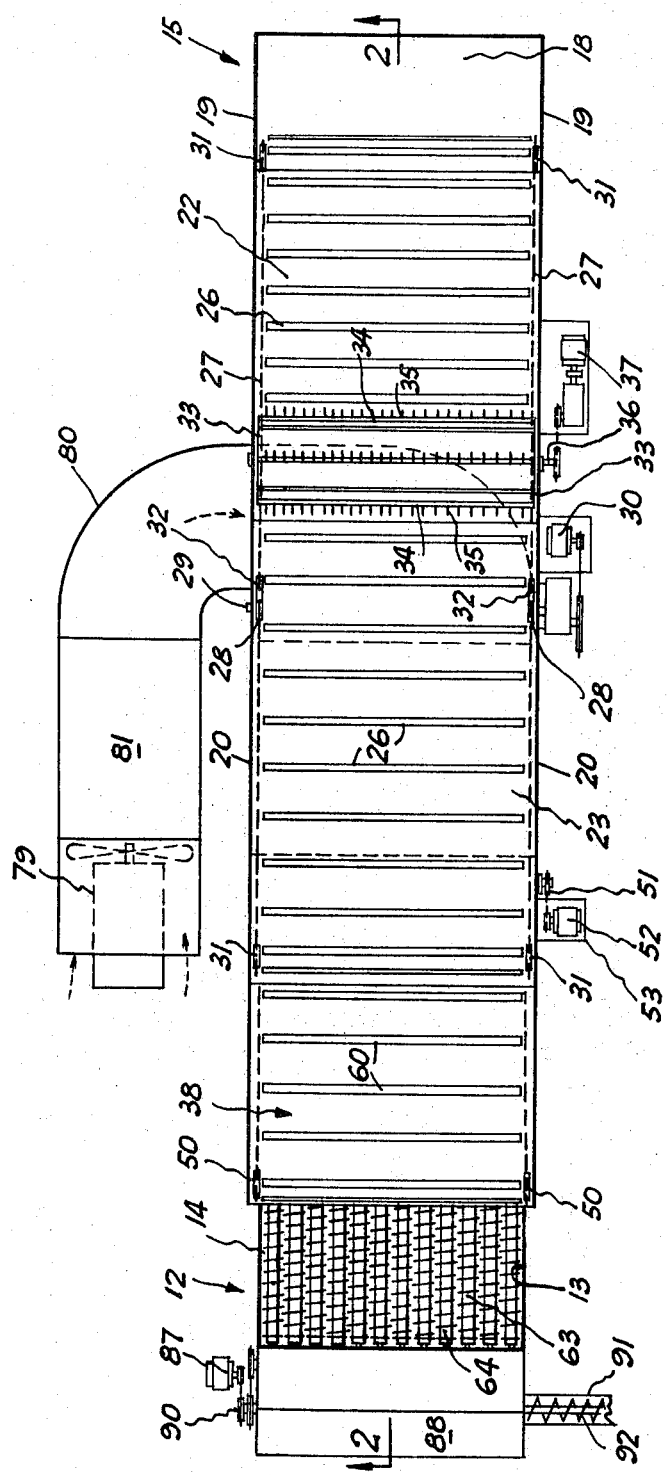
FIG. 1 is a plan of a preferred embodiment of the invention.

FIG. 10 is an end elevation of a rotary screed shown dotted in FIG. 1.

FIG. 11 is an incomplete side elevation looking in the direction of line 11—11 in FIG. 10.

Referring to the drawings the drying chamber is a box-like structure 12 which may be housed in a shed or the like. It may be a shed-like building in its own right, or it may be the body of an automotive vehicle if the dryer is required to be transported to various forage harvesting sites. In any case the chamber is preferably roofed (roofing not shown) to keep out rain.

The chamber consists of a skeletal or frame structure (not shown) which is internally smooth-surfaced to facilitate gravity descent of forage discharged into it. The frame structure may be internally lined or clad by walls 13 of smooth material such as sheet steel.

The chamber has a top opening 14 through which green forage may be fed into the chamber. This infeed may be effected in several ways; for example, the mown forage may be delivered into the intake hopper of a conventional elevator chute the upper end of which terminates directly above the chamber interior. Such an arrangement could be sufficient where the apparatus is designed on a small scale, or the lateral cross-sectional area of the drying chamber is small relative to its height, so that simple dropping of forage into the chamber, (as the output of a conventional elevator chute) would suffice to effect substantial evenness of forage deposit within the chamber. In this last connection, experiment has shown that for best forage drying efficiency it is desirable for the mass of forage in the drying chamber to be of substantially uniform depth throughout the length and breadth of the drying chamber. To this end, the illustrated preferred embodiment includes forage spreading and feed means as shown in FIGS. 1, 2 and 8 to 11.

Referring more particularly to these figures, a forage receiver trough 15 has a floor part of which (16) is inclined, and the remainder (17) horizontal. The trough has end-wall 18 on to which green forage may be dumped, and sides 19 which extend into horizontal portions 20. The trough may be supported in any convenient way, for example, by way of a pedestal indicated at 21 (FIG. 2) and by wall portions 20 being bolted or otherwise secured to the sides of the drying chamber.

End-wall 18 has a slot in it (not shown) which is just large enough to provide working clearance for entrance into the trough of the inclined working flight 22 of an infeed conveyor belt. This belt has a horizontal working flight 23 and a return or non-working flight indicated at 24. The belt consists of a flexible endless band 25 which extends laterally for substantially the full width of trough 15 and that of the drying chamber. The working surface of the belt has forage engaging cleats on it as indicated at 26. The longitudinal edge margins of the infeed belt are fixed to a pair of sprocket chains 27. Chains 27 mesh drive sprockets 28 keyed on drive shaft 29 driven by motor 30 (see FIG. 1). Chains 27 also mesh idler sprockets 31 and jockey sprockets 32. Sprockets 31 and 32 are conventionally mounted for free rotation as will be well understood.

Forage travelling upwardly on working flight 22 is confronted by the rotary screed shown in FIGS. 1, 2, 10 and 11. It consists of a pair of end frames 33 carrying bars 34 furnished with prongs 35. Frames 33 are fixed on shaft 36 in bearings on the sides of trough 15. Shaft 36 is driven by a motor, indicated at 37 in FIG. 1, so that the prongs 35 adjacent working flight 22 will move oppositely to the upward movement of that flight. Thus, forage dumped at the lower end of flight 22 will be levelled or screeded so that it proceeds to flight 23 as a swath of substantially even thickness.

When the forage swath reaches the departure end of flight 24, it falls on to a traverse conveyor 38. This conveyor is virtually the same (except for being shorter) as the infeed conveyor part of which lies directly above it. The similarity will be particularly apparent by referring to FIG. 9.

The traverse conveyor forms part of a mobile truck 39 able to run lengthwise of the open top of the drying chamber by means of flanged wheels 40 and 41 riding rails 42 and 43 fixedly mounted on the longitudinal sides of the drying chamber. The truck includes a frame or chassis 44 which carries bearings 45 and 46 for a drive shaft 47 and an idler shaft 48. These shafts respectively carry the drive sprockets 49 and the idler sprockets 50 for the chains of the traverse conveyor belt.

The drive shaft 47 is rotatable in either direction, through suitable transmission devices indicated at 51, by a reversible motor 52 mounted on a platform 53 fixed on the truck chassis 44.

Shaft 47 also has a drive gear keyed on it, which meshes a stationary rack fixedly mounted relative to the drying chamber. This drive gear may be a sprocket wheel 54 and the rack a length of sprocket chain 55 fixed on a bearer 56 which, in turn, is fixed on the adjacent chamber wall 13.

Platform 53 carries a striker 57 having the length of its travel path defined by a pair of limit switches 58 and 59 (switch 59 is not shown in FIG. 8 but is indicated in FIG. 2). Switches 58 and 59 are circuited with the reversible motor 52 so that when the striker 57, in advancing towards either one of them depresses it, so to reverse the direction of motor rotation and thus cause the truck then to travel towards the companion limit switch. The motor is fed by supply cables which are sufficiently flexible and slack to permit the required truck travel, and this travel is so arranged, by suitable placement of the limit switches 58 and 59, that the working flight 60 of the traverse conveyor (or rather that end of it which, for the time being, is its leading end) will approach as closely to the adjacent end of the drying chamber as is compatible with avoiding spillage of forage outside the chamber.

It will be seen that the drive arrangements for the truck 39 and for the working flight 60 of the traverse conveyor belt are such that that flight always travels in the same direction as the truck but at twice the linear speed of the truck. It will also be apparent that, provided forage is dumped into the receiver trough 15 roughly over its full width, forage will arrive on the traverse conveyor as a swath of substantially uniform thickness (due to the action of the rotary screed) extending laterally for the full width of the traverse conveyor. This, combined with the reciprocatory travel of that conveyor, assures substantially uniform distribution of the forage, within the drying chamber, throughout the length and breadth of that chamber.

The plenum box is constituted by a box floor 61 and downward extensions 62 of the drying chamber walls. The top of the plenum box and the bottom of the forage drying chamber is defined by the previously mentioned forage support grille.

The illustrated grille 63 consists of an array of parallel shafts 64 (preferably tubular, as shown, for lightness) which extend longitudinally of the plenum box and the chamber. (They could, of course, extend laterally). Each of the shafts 64 carries a plurality of forage "support and transfer" elements. These elements may be of widely differing forms provided they are such that when the shafts which carry them are stationary they (with the shafts) are able to support a stack of forage in the drying chamber; and, when the shafts are alternately contra-rotating (see arrows 65 in FIG. 7) they are able to transfer the previously supported forage downwardly into the plenum box.

It follows, that the elements in question could be prong-like fingers which project radially from the shafts 64 and are suitably spaced apart, both circumferentially and longitudinally of the shafts 64, to perform as required. However, the elements under discussion preferably are of the form more particularly illustrated in FIGS. 6 and 7.

Referring mainly to these two figures, the support and transfer elements comprise square-holed washer-like plates 66 and longitudinal vanes 67. These plates and vanes are secured to the shafts 64 in any convenient way for example, by tack welds as indicated at 68.

Plates 66 are preferably circumferentially staggered as best shown in FIG. 7. Plates 66 are preferably twisted (non-planar) and vanes 67 have a long-pitch helical set, as best shown in FIG. 6.

The shafts 64 are rotatable by a drive mechanism which is such that each shaft contra-rotates relative to its immediate neighboring shafts. When the shafts are at rest, they, with plates 66 and vanes 67, suffice to support forage deposited in the drying chamber. When the shafts are contra-rotated those parts of the plates 66 and vanes 67 which are rising agitate and loosen the forage material above them and the descending parts engage the forage material and send it downwardly so that it is discharged into the plenum box.

The shafts may be contra-rotated in any convenient way for example, by use of meshing gear pinions and one or more master gears receiving drive through a reduction gear box from an electric motor. However, this drive mechanism preferably consists (see FIGS. 3 and 4) of a motor 69, sprocket pinion 70 keyed on motor shaft 71, chain 72, main sprocket wheel 73 and twin sprockets 74 keyed on countershaft 75, chains 76, jockey sprockets 77, and final sprockets 78 respectively keyed on the grille shafts 64.

Means for delivering a drying gas into the plenum box may consist of an ordinary air blower 79 having its output trunk 80 opening into the plenum box through one of its side walls or its floor. Air is preferably used as the drying gas and it may be heated by passing through a conventional air heater indicated at 81.

The conveyor devices for taking dried forage out of the plenum box may be of known straw-walker type, but these devices are preferably as illustrated and consist of an endless belt conveyor 82 which may be of the same kind as the infeed conveyor belt or the traverse conveyor previously described herein.

Conveyor belt 82 runs on chains meshed with drive sprocket 83, idler sprockets 84 and jockey sprocket 85. Sprocket 83 is keyed on a drive shaft 86 driven by a motor 87 (see FIG. 1).

Dried forage falling from the support grille 63 is deposited on the top working flight of conveyor 82 and is discharged into an air lock device of known kind for example, of the kind comprising a cylindrical casing 88 which houses a radially vaned rotor 89 mounted on shaft 90 and driven by motor 87.

Dried forage discharged from the air lock may simply be taken away for use, storage or further treatment elsewhere. However, the air lock preferably delivers the dried forage into the trough 91 of an auger conveyor 92 which is also driven by motor 87 and delivers the dried forage directly to a hammer mill or other pulverizer which in turn delivers its output to a pelletiser for subsequent storage of the forage in that form.

It will be apparent from the foregoing that the rate at which forage is delivered to the conveyor 82 will depend upon the periods for which the support grille is in operation, and this in turn will depend upon whether the forage directly above the grille floor has reached the required degree of dryness. Clearly there is no need for conveyor 82, the air lock 88–90 or the conveyor 92 to operate unless the support grille is also operating. Therefore, the drives for these items may be coordinated so that the conveyor 82 and the other items driven by motor 87 operate only when the support grille 63 is in operation.

The periods for which the support grille should be operated may be determined by periodic sampling of the forage output of the apparatus, to test it for dryness. Depending on the degree of dryness the drive mechanism for the support grille floor may be halted, slowed down or speeded up as may be necessary.

For preference however, the operation of the support grille is made automatically contingent upon the dryness of the forage at a selected height above that grille. Such automatic control may be readily achieved by including an on-off control switch in the circuit of motor 69 which is responsive to hygrometric probe devices placed in the mass of forage under treatment.

The hygrometric probe devices may be of the known kind able to be set in terms of a selected degree of humidity and when that degree is reached (being such a degree of dryness, for example, as when the forage contains no more than 10 percent of its original moisture) closes the mentioned control switch. This switch may be the ordinary starter switch of the motor for the support grille drive mechanism or a relay switch circuited with the starter switch.

Two or more hygrometric probes may be employed two being indicated at 93 and 94 in FIG. 2. The support grille drive mechanism may be arranged to operate in response to the average readings of the probes.

However two probes such as 93 and 94 are preferably placed at slightly different levels in the drying chamber as shown. Probe 94 being a "dryness" measurer which starts operation of the support grille floor and the higher probe 93 a "wetness" measurer which halts that operation.

As already indicated although operation of the drive for conveyor 82 and other items associated with it may be independent from that of the support grille drive, it is preferable for both drives to be under the same hygrometric control either electrically by way of separate drive motors for each or mechanically by way of a gear train coupling from a single drive motor.

What is claimed is:
1. A forage dryer comprising:
   a. a drying chamber;
   b. means for feeding forage to be dried into the top of said chamber and distributing it laterally and longitudinally of said chamber;
   c. a plenum box at the bottom of said chamber;
   d. a forage support grille which defines the bottom of said chamber and the top of said plenum box, which comprises a plurality of substantially parallel and contra-rotatable supports for discharging dried forage from said chamber into said plenum box, and which when stationary are able to support forage deposited in said chamber;
   e. drive mechanism for rotating said supports;
   f. means or delivering a drying gas into said plenum box for upward discharge through said grille; and
   g. conveyor devices for removing dried forage from said plenum box.

2. A forage dryer according to claim 1 wherein said means for feeding forage to be dried, comprise: an inclined receiver trough having a lower end into which forage may be dumped and its upper end leading into a horizontal portion overlying the top of said drying chamber, and a belt conveyor having a working flight which extends within said receiver trough from said lower end, and into said horizontal portion to a discharge point above said open top.

3. A forage dryer according to claim 2 which includes a traverse conveyor movable longitudinally along said open top and beneath said discharge point.

4. A forage dryer according to claim 2 or which includes a rotary screed mounted a thwart said receiver trough adjacent the upper end thereof.

5. A forage dryer according to claim 1 wherein each said support consists of a shaft having forage support and transfer elements thereon.

6. A forage dryer according to claim 5 wherein said support and transfer elements consist of washer-like plates radially surrounding and fixed to said shafts, and vanes extending longitudinally of and fixed to said shafts.

7. A forage dryer according to claim 1 including means for controlling operation of said drive mechanism, comprising at least one hygrometric probe located within said drying chamber.

8. A forage dryer according to claim 3, including means for removing dried forage from said plenum box, comprising a conveyor belt mounted in said box directly below said support grille and an air lock mechanism into which said conveyor belt discharges matters deposited thereon.

9. A forage dryer according to claim 1, wherein said drying chamber comprises a substantially hollow enclosure for permitting materials to fall substantially unobstructedly within, and throughout the length and breadth of, said enclosure.

10. A forage dryer according to claim 1, wherein said drive mechanism includes means for intermittently rotating said supports.

* * * * *